Feb. 4, 1969
M. T. CARLSON
3,425,072
METHOD AND APPARATUS FOR TEACHING SWIMMING
Filed Feb. 24, 1967
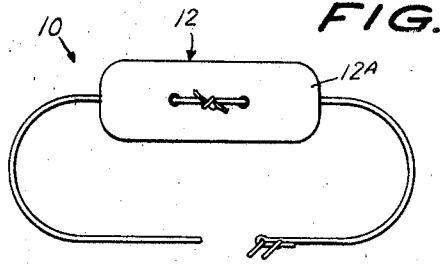
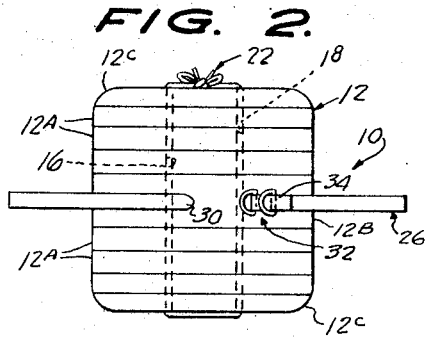
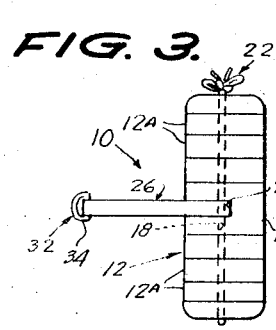
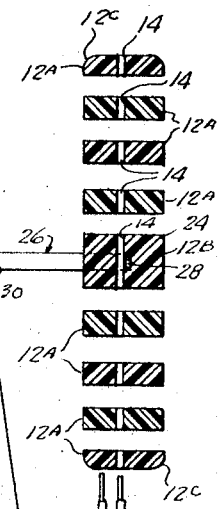
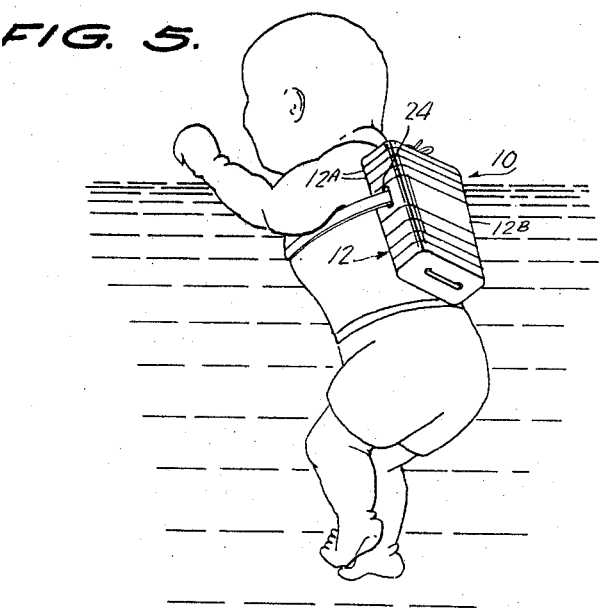
INVENTOR.
MERLE T. CARLSON
BY
Kimmel, Crowell & Weaver,
ATTORNEYS.

United States Patent Office 3,425,072
Patented Feb. 4, 1969

3,425,072
METHOD AND APPARATUS FOR
TEACHING SWIMMING
Merle T. Carlson, Houston, Tex.
(1210 Oriole Lane, Wharton, Tex. 77488)
Filed Feb. 24, 1967, Ser. No. 618,525
U.S. Cl. 9—339                                    1 Claim
Int. Cl. B63c 9/08

ABSTRACT OF THE DISCLOSURE

A variable volume aquatic float for releasable connection on the body of a user, the float capacity being adapted for adjustment in an inverse ratio with respect to the swimming ability of the user.

BACKGROUND OF THE INVENTION

This invention relates to the general field of buoyant devices or floats and, more specifically, the present invention pertains to the provision of a float especially designed as an aid to a swimming instructor in the teaching of the rudiments of swimming, and for subsequent use by the pupil or trainee independently of the instructor when the user's swimming technique has progressed to the point at which constant supervision by the instructor is no longer required.

The prior art is replete with showings of apparatus and methods for training nonswimmers to swim. However, and for the most part, such apparatus and methods have been designed to teach children and persons of more mature age to swim, and very little, if any, attention has been directed to the desirability of training infants and children of tender years this same ability. As a consequence, it is not infrequent that one will read in periodicals, especially newspapers published during the summer season, of the death of a child of tender years resulting from drowning.

For the most part, it is not difficult to teach persons to swim if a line of intelligent communication can be opened between the instructor and trainee. The problem of teaching infants and very young children is, however, much more difficult and complex for thought transference or communication between the instructor and trainee is at a minimum level. Additionally, in the teaching of a person to swim, the pupil is exposed to an environment which is frequently strange and foreign, and because of his lack of understanding of this new environment fear will build up because of his inability to adequately cope with and react to the new element.

It is, therefore, one of the primary objects of this invention to provide a method and apparatus for assisting an instructor to train persons to swim and wherein the apparatus is suitably adapted for use by the non-swimmer in the practice of the technique of swimming and with or without the constant supervision of the instructor.

Another object of this invention is to provide apparatus of the type generally referred to above, and wherein the apparatus comprises a float including harness means whereby the float may be releasably connected to the body of the user.

A further object of this invention is to provide a harness type float device or assembly for use by a nonswimmer, and wherein means are provided for increasing or decreasing the volumetric capacity of the floats in accordance with the swimming capability of the user.

Still another object of this invention is to provide a float device or apparatus of the type to which reference has been made supra and wherein the float is in the nature of a back pack including a harness for releasably connecting the pack to the body of the user.

This invention contemplates, as a still further object thereof, the provision of a swimmer's aid of the type generally described above, and wherein the aid is noncomplex in construction and assembly, inexpensive to manufacture and maintain, and which is rugged and durable in use.

Other and further objects and advantages of the instant invention will become more manifest from a consideration of the following specification when read in conjunction with the annexed drawing.

SPECIFICATION

Referring now more specifically to the drawing, reference numeral 10 designates, in general, a back pack harness type apparatus especially designed to assist an instructor in teaching persons to swim and as an aid to persons for practicing swimming strokes. While the method and apparatus according to this invention finds usage of particular value in the teaching of infants and children the rudiments of swimming, the method and apparatus disclosed herein for teaching swimming may be easily extended and adapted to teach persons of a more mature age to swim.

Thus, and in the drawing, the apparatus 10 constructed in accordance with the teachings of this invention is seen to be of a harness type back pack and comprises a laminated float 12 having an elongated substantially rectangular configuration. The several laminae 12A, 12B of the apparatus may be formed of any suitable light weight buoyant material, such as styrofoam, and wherein each of the laminae is a substantially rectangular block.

The laminae 12A, 12B are superimposed one on the other, and with the exception of the centermost one 12B, thereof, the blocks 12A are of substantially uniform and constant size. To serve a function to be described infra, the lamina or block 12B differs in one respect from its counterparts in that the block 12B has a substantially greater thickness than the thickness of any one of its adjacent blocks 12A. If desired, the laminae 12A at each end of the float 12 may be provided with a continuous arcuate chamfer as at 12C.

Each of the laminae 12A and 12B is formed with a pair of transversely extending openings 14 with one opening 14 being disposed, respectively, in inwardly spaced relation relative to an end of its associated block 12A, 12B. The spacings of the openings 14 in the blocks 12A, 12B is such that when the same are superimposed one on the other, in congruent relationship as is shown in FIGURES 2 and 3, the openings 14 of one block are aligned with the openings 14 of the next adjacent one thereof to provide the continuous passages 16, 18 adjacent, respectively, each end of the float 12.

A length of flexible cord or rope 20 is threaded downwardly through either of the passages 16, 18, one free end of the cord being extended downwardly from the uppermost one of the blocks 12A and extended across the lowermost one thereof for extension through the other of the passages 16, 18. This one free end of the cord or rope 20 emerges from the upper end of the uppermost one of the blocks 12A and is releasably connected to the other free end of the cord or rope 20 as by a conventional knot 22.

From the above described assembly of the float 12, it is obvious that the size thereof may be increased or decreased at will by adding or subtracting one or more of the blocks 12A.

The centermost blocks 12B, aside and apart from being somewhat thicker than the adjacent blocks 12A, also differs therefrom in another respect, namely, in that the block 12B is formed with a longitudinally extending centrally located passageway 24 which opens into the opposed ends thereof. This passageway 24 has its longitudinal axis perpendicular to the longitudinal axes of its adjacent openings 14 and is displaced laterally from these openings so as not to intersect therewith.

At 26 is indicated an elongated flexible strap having a bight portion 28 slidably received within the passageway 24, and a free end 30 which is adapted for releasable and adjustable connection with the conventional buckle means 32 carried at the other free end thereof.

The apparatus 10 having been described in detail above, its use as an aid in the teaching of an individual to swim in accordance with this invention is related with particularity below.

It is preferable that prior to the use of the apparatus 10 that the baby or infant be conditioned to the environment of the water in which he will learn to swim. To this end, the infant should be taken into the water in a series of rather short, but frequent, sessions. Each session should last about one half hour and should take place every day, or every other day, if possible. During these sessions, the infant should be constantly kept in the water and not permitted to run around and play on the short or at the pool side.

During the first few exposures to the water and during these sessions the infant may cry. This is not to be unexpected since large bodies of water are to most infants and children foreign environments and their natural reaction to such a foreign environment is to cry, especially if the temperature of the water is much colder than that of the ambient atmosphere. The parent or instructor will do well to ignore such outbursts of crying, and to this end the instructor should act overtly to assure the pupil that he has nothing to fear from the water and is in no personal danger. Once the child realizes that he is in no danger and that the instructor will not permit him to come to harm, the child will usually stop crying and begin to play and to enjoy himself.

Persistence by the instructor in ignoring the child's crying cannot be over-emphasized, and it is at this point that most parents have a tendency to give up their early training of the child. In persisting, the infant or child will soon become familiar with this new environment and will accept the same as readily as that he encounters in public.

It is here pointed out that as among infants and young children time would be wasted in trying to teach the formal swimming strokes, such as, for example, the crawl or breast strokes. It will suffice if the child will develop an adequate stroke of his own as his swimming prowess increases. The more formal strokes may be taught when the child becomes sufficiently mature to follow instructions. It is sufficient if the instructor and/or parent offers the child an opportunity to teach himself rather than to teach the infant through formalized training. To this end, the apparatus 10 and the method of teaching the infant to swim in accordance with this invention is admirably directed for it is not necessary that the instructor be, himself, a swimmer, in order to teach the infant or child to swim.

In conditioning the child to this new environment, the weather conditions should be favorable, the water temperature comfortable, and the child's experience with this new element made as pleasant as possible.

As has been stated above, the infant or child should first be exposed to the water during several, preferably two or three, sessions before the apparatus or device 10 is actually used. During these sessions the child should be taught to splash water, to blow bubbles into the water and to submerge all of his body.

As the infant learns these acts and becomes adjusted to the water, the instructor should practice holding the child in a substantially horizontal position while holding the child's head above the water. At this time, the instructor should encourage the child to move his body and, in particular, his hands and feet. The instructor provides the necessary support by holding the child with a hand on each side of the child's body, by placing a hand beneath his chest, or by holding the child across his partially submerged knee in a shallow part of the water. This step in the child's training is one in which he is most likely to cry, but as has been stated above, this reaction should be ignored by the instructor and his training persisted.

With the child accepting the water as a familiar environment and having progressed to the point where he performs the acts outlined above with ease and without fear, the apparatus 10 is now strapped to the body of the child. As is shown in FIGURE 3 of the drawing, the float 12 is adapted to fit against the back of the child with the upper end thereof being spaced slightly below the shoulders, and the lower end of the float 12 positioned substantially at the child's waist. The strap 26 is extended forwardly under the arms of the child and across his chest, and the two ends 30, 32 are releasably and adjustably connected together in such a manner that the float 12 is held securely on the infant's back without exerting strap tension which would cause discomfort.

With the apparatus 10 harnessed on the body of the child, the instructor continues to hold and support him in the same manner as described above. As the child, in subsequent sessions, becomes accustomed to the apparatus 10, the attendant should then gradually begin to remove his support from the child until the child is supported only by the apparatus 10, per se, and the child's own hand and foot movements. During all of this time the instructor or attendant should constantly encourage the child vocally as well as through his overt actions and to thereby build up the confidence of the child in his own capabilities.

When the child has reached the point at which he is independent of the instructor's support, the instructor should then directly concentrate upon encouraging the child to use his hands and feet, and when the child seems or appears to feel thoroughly secure and confident in his swimming ability to the extent that he actually enjoys his swimming experience with the aid of the device, the instructor will begin removing one or more of the blocks 12A and thereby selectively decrease the volumetric capacity of the apparatus 10. No one of the laminae or blocks 12 is taken away, however, until the instructor is absolutely certain that the infant can compensate for its removal, that is, the child must be able to at the very least keep his mouth above the water. It is contemplated that during the initial stages of the removal of the blocks 12A the child will normally maintain a vertical position, but once he compensates for the lesser buoyant condition of the apparatus 10, the child will tend to assume a more horizontal position generally comparable to that which is assumed in normal swimming and independent of the use of any aid.

As the child continues to show progress, more and more of the blocks 12A are removed until there only remains the original center block 12B. While this single remaining block does not, in effect, provide much buoyancy, the child is psychologically conditioned to its presence and may prove to be quite reluctant to enter the water without this crutch. It is necessary, therefore, that the child be weaned from this block and to this end it is sometimes necessary to loosely harness the block 12B on the wearer at the beginning of a swimming session and subsequently remove the same without calling the attention of the child thereto.

As the child becomes independent of the swimming apparatus 12 he may be encouraged to swim longer distances and he will quickly learn that he can swim much more rapidly and cover longer distances if he swims in a horizontal position and with his head down. At this stage the child will learn to swim from one place to another while holding his breath, and thereafter, the child will quickly learn to properly breathe while swimming and his training can be then followed with more sophisticated swimming instruction.

While in the described embodiment of this invention the means for releasably connecting the blocks 12A, 12B together is shown as the cord or rope 20, it will be obvious to those skilled in the art that strap means or other flexible releasable connecting means could be substituted therefor, and that the body embracing strap 26 could find its full equivalent in other related means not shown.

Having described and illustrated this invention in detail, it will be understood that the same is offered merely by way of example.

I claim:

1. A buoyant apparatus to aid a person to learn to swim comprising:
    a generally rectangular elongated float block having a longitudinal passageway extending from end to end completely therethrough, said block having a pair of transverse openings extending therethrough in spaced parallel relation,
    an elongated strap extending through said passageway,
    means for detachably securing the free ends of said strap together to secure said block to a person's body,
    a plurality of generally rectangular elongated float blocks having the same length and width as said first named block and having a pair of transverse openings extending therethrough in spaced parallel relation said plurality of blocks arranged in abutting stacked relation with said first named block and with the pairs of openings in said first named block and said plurality of blocks arranged in alined relation,
    a flexible cord laced through said openings and tied to detachably secure said plurality of blocks to said first named block, whereby the buoyancy of said apparatus may be selectively reduced by removing individual float blocks and retying the flexible cord to detachably secure the remainder of said blocks to said first named block, to reduce the carrying capacity of said apparatus as a person improves in swimming skills.

References Cited

UNITED STATES PATENTS

| | | | |
|---|---|---|---|
| 727,444 | 5/1903 | Recordon | 9—338 |
| 1,506,359 | 8/1924 | Bower | 9—340 |
| 3,141,180 | 7/1964 | Pursley | 9—340 |

FOREIGN PATENTS 601,211 11/1925 France.

MILTON BUCHLER, *Primary Examiner.*

T. W. BUCKMAN, *Assistant Examiner.*